Nov. 10, 1959 C. JELINEK, JR 2,912,496

FACSIMILE TELEGRAPH APPARATUS

Filed Dec. 28, 1951 2 Sheets-Sheet 1

FIG. I

INVENTOR.
C. JELINEK, JR.

BY

ATTORNEY

Nov. 10, 1959 C. JELINEK, JR 2,912,496

FACSIMILE TELEGRAPH APPARATUS

Filed Dec. 28, 1951 2 Sheets-Sheet 2

INVENTOR.
C. JELINEK, JR.

BY [signature]

ATTORNEY 2,912,496
Patented Nov. 10, 1959

2,912,496

FACSIMILE TELEGRAPH APPARATUS

Charles Jelinek, Jr., Verona, N.J., assignor to The Western Union Telegraph Company, New York, N.Y., a corporation of New York Application December 28, 1951, Serial No. 263,907

2 Claims. (Cl. 178—7.1)

Figure 1:
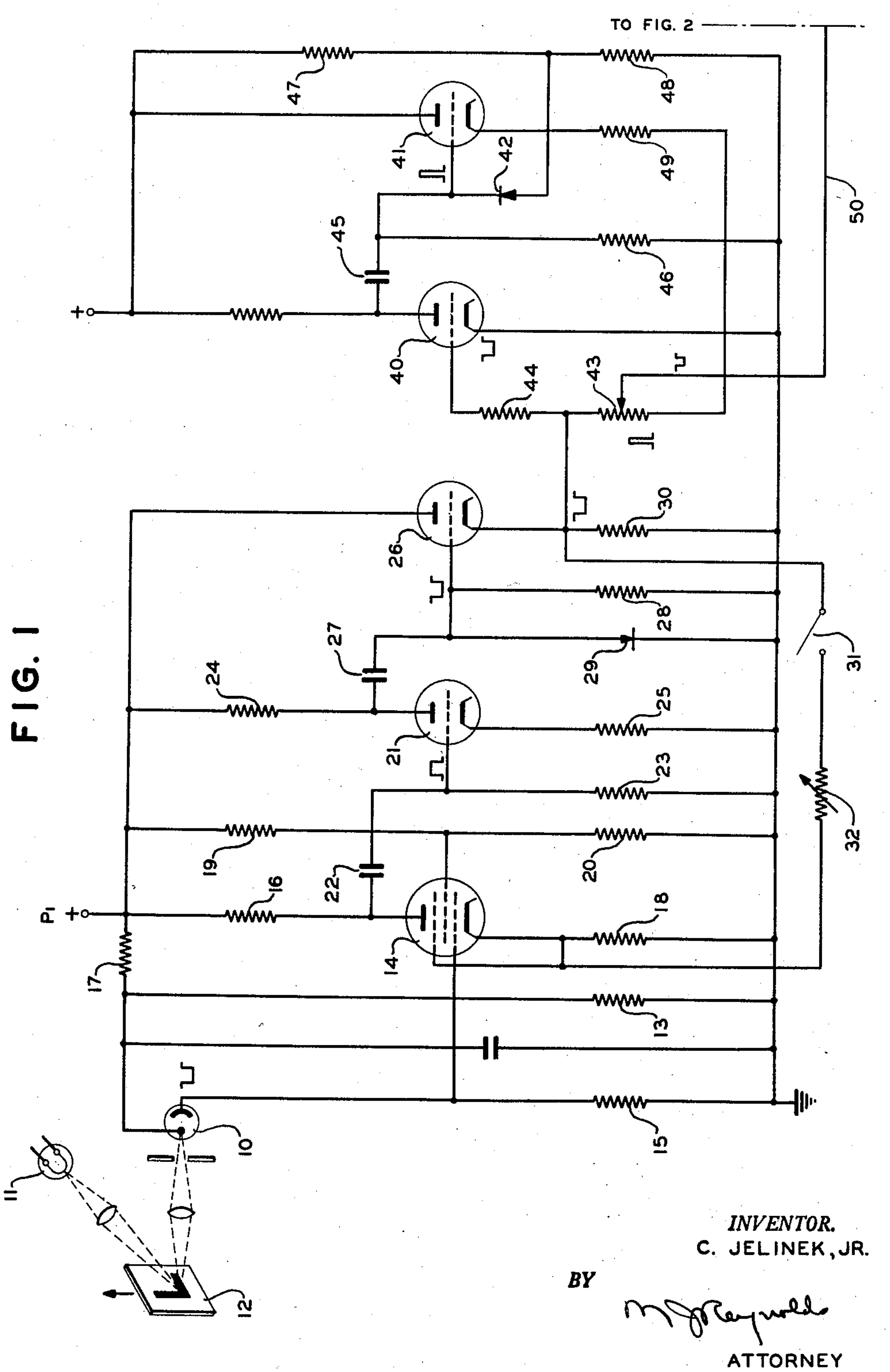

The present invention relates to telegraphic communication by facsimile transmission and more particularly to facsimile transmission apparatus employing optical scanning means.

In facsimile transmission of pictorial subject matter, linear amplification of the facsimile signals is desirable in order to insure accurate reproduction of the subject copy. In a system arranged to transmit pictorial subject matter, aperture distortion produced in the photoelectric transducer will generally not be of a serious character and may be compensated for with conventional methods.

In facsimile transmission of message copy, on the other hand, a nonlinear amplitude response characteristic favoring small amplitude signals is desirable to compensate for deficiencies in subject copy. A system arranged to operate in this manner will tend seriously to accentuate aperture distortion effects so that blurring of letters attributable to aperture distortion will become highly objectionable.

In the conventional optical scanner employed with a facsimile transmitter, the light beam reflected from the message copy passes through an aperture in an opaque disk to impinge upon a light sensitive device. In an ideal scanner the light beam defined by the aperture would be of an infinitely small cross sectional area. However, in a practical system, since the aperture is of a finite cross sectional area, the light beam will scan the paper at a point having a fixed or predetermined area. It is this cross sectional area of the light beam that causes aperture distortion.

Consider, for example, a marked elemental area on the message copy, as the mark comes into the view of the circular aperture an intelligence pulse starts to form. Then as the message paper moves a distance equal to the width of the elemental area the circular aperture is filled and the intelligence pulse is at its peak. Then as the message copy continues to move the elemental area will leave the view from the aperture and the intelligence pulse will decrease to its cut off point. Thus, it is seen that a particular marked elemental area will result in an intelligence pulse equal to almost twice the width of the area.

All of the marked areas on the message copy are not of the same density of blackness but rather of different shades of gray. When a gray elemental area comes into the scanning area, the phototube will not react as rapidly as in the case of a black area. Also, as the gray mark leaves the scanning area the phototube will cease reacting sooner than it would were the mark a more reflective black area. It is seen then that the width of the resulting intelligence pulses will depend upon the density of the marked areas.

Another case in which the finite area of the scanning aperture distorts the resulting pulse is when a thin black line is scanned having a width less than that of the elemental scanning area. The phototube will react as long as the line is within the scanning area although a true pulse representation would have a width equal to a period of message paper travel of the line width.

It is seen then that these various scanning circumstances result in a widening of the intelligence pulses due to the finite cross sectional area of the scanning aperture. As is well known in the art, this distorted widening of the pulses is termed aperture distortion.

In the transmission of message copy a non-linear amplitude response characteristic favoring small amplitude signals is desirable to compensate for the varying shades of marked areas on the copy. However, in providing such a system having non-linear amplitude response, the effect of aperture distortion is accentuated, in that the intelligence pulses are further widened as will become apparent hereinafter. It is to this general problem that the present invention is directed.

Accordingly, it is an object of the invention to provide new and improved apparatus for transmission of facsimile telegraph signals.

More particularly, it is an object of the invention to provide facsimile transmission apparatus having a non-linear amplitude response and in which aperture distortion effects are compensated.

Another object of the invention is to provide facsimile telegraph apparatus of the above type wherein a linear amplitude response suitable for pictorial subject matter may selectively be provided.

Further objects of the invention will appear from the following description.

In accordance with the invention, these objects are achieved by providing an electronic amplifier coupled to the scanning means and having a nonlinear amplitude response characteristic at which low amplitude signals are amplified by a larger amount than high amplitude signals, means to differentiate the amplifier output signals to produce a compensating signal having a magnitude substantially equal to the magnitude of the effective aperture distortion components and in phase opposition thereto and means to combine the amplifier output signal and the compensating signal to produce a facsimile output signal substantially free of aperture distortion components.

Figure 2:
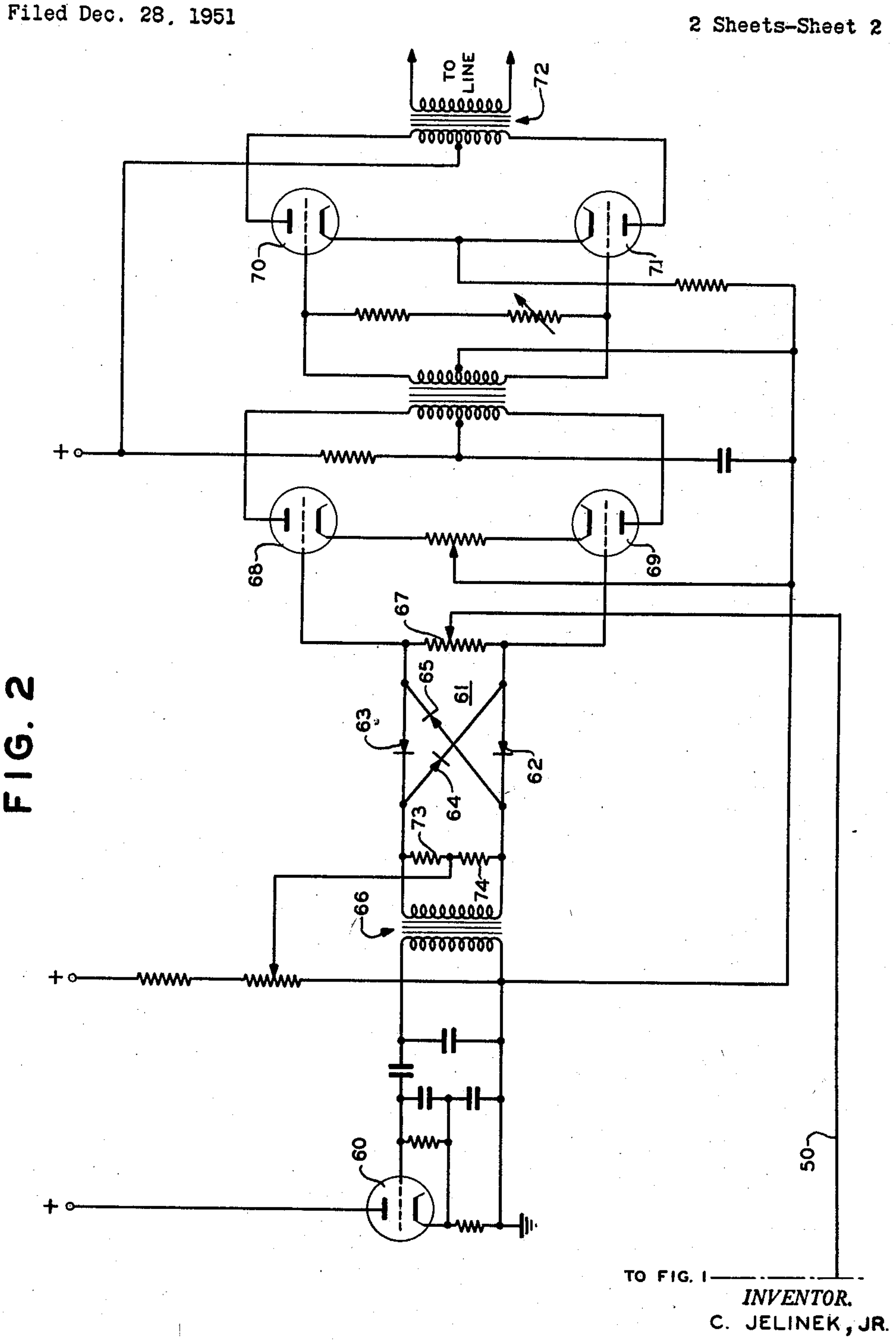

The invention will now be described in greater detail with reference to the appended drawing in which:

Figs. 1 and 2 illustrate a compensated facsimile amplifier-modulator in accordance with the invention.

Referring now to the drawing and more particularly to Fig. 1, there is shown a photocell 10 arranged to receive light supplied by a lamp 11 and reflected from a transmitting copy sheet 12 having the subject matter to be transmitted delineated thereon. The light beam reflected from the copy sheet 12 passes through a circular aperture 8 in opaque plate 9.

The anode of photocell 10 is coupled to a source of positive potential P1 through a voltage divider network comprising a resistor 13 and a resistor 17. The cathode of photocell 10 is connected to the control grid of a pentode amplifier tube 14, a resistor 15 being interposed between the cathode of photocell 10 and ground. When the light beam from lamp 11 is reflected from a marked area of copy sheet 12, the intensity of illumination impinging on photocell 10 decreases, so that a negative voltage pulse is produced at the cathode of photocell 10 and applied to the control grid of tube 14. The anode of tube 14 is coupled to source P1 through a resistor 16, while the cathode thereof is coupled to ground through a biasing resistor 18. The screen grid of tube 14 is maintained at the proper operating potential through a voltage divider network comprising resistors 19 and 20. The anode of tube 14 is coupled to the control grid of sharp cut-off triode amplifier tube 21 through a capacitor 22, a grid resistor 23 intercoupling the grid of tube 21 and ground.

The anode of tube 21 is coupled to source P1 through a large resistor 24, while the cathode thereof is coupled to ground through a biasing resistor 25. The anode of tube 21 is coupled to the control grid of a second sharp cut-off triode amplifier tube 26 through a capacitor 27. The control grid of tube 26 is coupled to ground through the parallel combination of a resistor 28 and a rectifier 29. Tube 26 is connected as a cathode follower, a load resistor 30 intercoupling the cathode thereof and ground. The cathode of tube 26 is also connected in degenerative relationship to the cathode of tube 14 through a switch 31 and a variable resistor 32.

A negative voltage pulse appearing at the control grid of tube 14 is repeated at the control grid of tube 21 as a positive pulse, at the control grid of tube 26 as a negative pulse and at the cathode of tube 26 as a negative pulse.

It is frequently desirable that the amplifier exhibit a good low frequency response to frequencies as low as 2 cycles. To achieve this low frequency response, the time constants of resistor-capacitor combinations 22—23 and 27—28 should be, respectively, approximately two seconds. Good high frequency response to frequencies in excess of 5000 cycles is achieved by not by-passing resistors 18, 19 and 25.

The facsimile signal background level, which is lost by using capacitor coupled amplifier stages, is restored through the use of rectifier 29 in the grid circuit of tube 26. Rectifier 29 is so poled as to conduct when the copy sheet background is being scanned. In this manner, the background level is clamped to ground potential and a ground potential reference level is provided irrespective of the copy sheet background shade.

Since both tubes 21 and 26 are sharp cut-off tubes and since resistor 24 in the anode circuit of tube 21 is given a high value, signal levels above a predetermined value will drive tube 21 to plate current saturation and tube 26 to plate current cut-off. This predetermined signal level is set by proper selection of the circuit parameters, which are preferably chosen so that tube 26 operates near cut-off. Operation near cut-off provides a proportionately large change in output signal strength for weak input signals than for strong input signals. In this manner, poorly defined subject matter will be reproduced substantially as darkly as well defined subject matter.

Operation of tube 26 near cut-off, with the resulting nonlinear amplitude response, as described above, is desirable for message transmission to compensate for deficiencies in subject copy. In the transmission of pictorial subject matter, however, a linear amplitude response is desirable. The linear amplitude response is achieved through the use of degenerative feedback secured by closing switch 31, thereby connecting resistor 32 between the cathodes of tubes 14 and 26. The amount of feedback is adjusted by adjusting the value of resistor 32 so that tube 21 is not driven to plate current saturation and tube 26 is not driven into plate current cut-off. In this manner, a substantially linear amplitude response is secured without a serious shortening of the coupling circuit time constants.

If adjustment of the triggering level, i.e., the lowest signal level at which tube 26 will be driven close to plate current cut-off, is desired, switch 31 may be maintained closed when message copy is to be transmitted. In this condition, adjustment of the value of resistor 32 will set the triggering level.

Operation of the amplifier in the triggered manner, in which even a very small signal results in a large output, seriously increases the effect of aperture distortion, resulting in a widening of all lines. Since tube 26 is biased near the cut-off point and operates on the non-linear part of its characteristic, the incoming intelligence pulses applied to the grid thereof will trigger this tube for a period depending upon the amplitude and width of each pulse. That is, a pulse of high amplitude or greater width will cause tube 26 to be triggered for a longer period of time than a pulse of low amplitude or shorter width. Therefore, the negative pulses appearing at the cathode of tube 26 will be further exaggerated in width. Thus there is a further distortion of the intelligence pulses as they pass through tube 26 which is a direct result of the aperture size. It is seen then that the pulse appearing at the cathode of 26 has been widened by aperture distortion at the opaque scanning plate and phototube and further exaggerated in width in passing through the amplifier. The total widening or distortion of the pulses due to these elements is referred to herein as effective aperture distortion. This widening effect causes the openings in recorded letters such as *a*, *e* and *b* to become closed, making reading or even identification difficult.

Means for narrowing lines, thereby compensating for undesired effective aperture distortion, is provided through tubes 40 and 41, rectifier 42 and the associated circuit elements.

The distorted or widened output signal across resistor 30 appears across a resistor 43 and is applied to the control grid of tube 40 through a resistor 44. This distorted or widened output signal is amplified and inverted by tube 40. The anode of tube 40 is coupled to the control grid of tube 41 through a capacitor 45. The control grid of tube 41 is coupled to ground through a resistor 46, such that the capacitor 45 and resistor 46 form a differentiating network which converts a positive voltage pulse at the anode of tube 40 into a positive-going voltage peak at the control grid of tube 41. The voltage peak occurs at a time corresponding to the leading edge of the voltage pulse at the anode of tube 40.

The control grid of tube 41 is returned to ground potential through a rectifier 42 and a voltage divider network comprising resistors 47 and 48. Rectifier 42 is so poled as to suppress the negative-going voltage peaks resulting from differentiating the trailing edge of the positive voltage pulse at the anode of tube 40.

The positive voltage peak at the control grid of tube 41 is repeated at the cathode thereof and applied to resistor 43 through cathode follower resistor 49. It is evident that two signals appear across resistor 43. One signal is a negative voltage pulse from the cathode of tube 26 and the other a positive-going voltage peak from the cathode of tube 41. Since the voltage peak occurs at the same time as the leading edge of the voltage pulse, and since they are of opposite polarity and substantially equal magnitudes, effectively a small portion of the leading edge of the negative voltage pulse is cancelled. Accordingly, the output signal which is derived from resistor 43 and which is applied to the modulator on Fig. 2 through a conductor 50, is narrower than the signal developed at the control grid of tube 26. In this manner, aperture distortion, which is accentuated by the triggering action described above, is compensated and the lines marked on a recording copy sheet are given the proper width without losing the increased sensitivity provided by the triggering action.

Referring now to Fig. 2, a tube 60 together with its associated circuit elements forms a carrier frequency oscillator. The carrier frequency output is applied to a balanced modulator 61 comprising rectifiers 62, 63, 64 and 65, through a transformer 66. The narrowed facsimile signal is applied to modulator 61 through a potentiometer 67, the tapping of which is connected to conductor 50.

The modulated output signal is applied to the control grids of a pair of push-pull amplifier tubes 68 and 69. The output of tubes 68 and 69 is again amplified in a push-pull power amplifier stage comprising tubes 70 and 71, the output of which is applied to a transmission line, radio transmitter or other communication link through an output transformer 72.

A positive bias voltage is applied to modulator 61 through a pair of series connected resistors 73 and 74 coupled across the secondary winding of transformer 66. This positive bias voltage cancels the bias voltage impressed on potentiometer 67 due to cathode currents of tubes 26 and 41 of Fig. 1. The positive bias applied through resistors 73 and 74 may, if desired, serve as a threshold control.

While the invention has been described in a specific embodiment thereof and in a specific use, it is not desired that it be limited thereto, for obvious modifications thereof will occur to those skilled in the art without departing from the spirit and scope of the invention as set forth in the appended claims.

What is claimed is:

1. Facsimile telegraph apparatus comprising optical scanning means adapted to scan a transmitting blank having the subject matter delineated thereon to produce signals of generally rectangular voltage pulses having effective aperture distortion components, an electronic amplifier having an input and an output, the amplitude response characteristic of said amplifier being nonlinear whereby low amplitude signals above a given level are amplified by a larger amount than high amplitude signals, means coupling said scanning means to said amplifier input, vacuum tube means connected to said amplifier output whereby the signal pulses are inverted, differentiating means connected in the anode circuit of said vacuum tube means whereby compensating pulses are produced, cathode follower circuit means connected to said differentiating means, means intercoupling said amplifier output and said cathode follower whereby the facsimile signal pulses at said amplifier output are combined with said compensating pulses to produce signals substantially free of effective aperture distortion.

2. Facsimile telegraph apparatus comprising optical scanning means adapted to scan a transmitting blank having the subject matter delineated thereon to produce signals of generally rectangular voltage pulses having effective aperture distortion components, an electronic amplifier having an input and an output, said amplifier comprising a first electron discharge tube having a sharp cut-off characteristic and being coupled to said scanning means, a second electron discharge tube having a sharp cut-off characteristic and being coupled to said first electron discharge tube, biasing means connected to said second electron discharge tube whereby said second tube is biased to operate in the neighborhood of plate current cut-off whereby said amplifier is given a nonlinear amplitude response characteristic at which low amplitude signals are amplified by a larger amount than high amplitude signals, vacuum tube means connected to the output of said amplifier to invert the signal pulses, differentiating means connected to the anode circuit of said vacuum tube means whereby compensating pulses are produced, cathode follower means connected to said differentiating means, means intercoupling said amplifier output and said cathode follower whereby the facsimile signal pulses at said amplifier output are combined with said compensating pulses to produce signals substantially free of effective aperture distortion.

References Cited in the file of this patent

UNITED STATES PATENTS

| | | |
|---|---|---|
| 2,210,390 | Weathers | Aug. 6, 1940 |
| 2,315,362 | Wise et al. | Mar. 20, 1943 |
| 2,366,363 | Shonnard | Jan. 2, 1945 |
| 2,376,034 | Collings | May 15, 1945 |
| 2,579,475 | Curtis | Dec. 25, 1951 |
| 2,649,501 | Cope | Aug. 18, 1953 |